United States Patent [19]

Shotbolt et al.

[11] 3,999,782
[45] Dec. 28, 1976

[54] CONNECTOR APPARATUS

[75] Inventors: Keith Shotbolt, Gerrards Cross, England; Pierre Ory, Marseille, France

[73] Assignee: Comex Marine Services, Inc., Houston, Tex.

[22] Filed: Aug. 21, 1975

[21] Appl. No.: 606,421

[30] Foreign Application Priority Data

Nov. 14, 1975 United Kingdom ............. 74.37533
Mar. 4, 1975 United Kingdom ............... 8958/75

[52] U.S. Cl. .......................... 285/18; 285/DIG. 13; 55/323
[51] Int. Cl.² ....................................... F16L 35/00
[58] Field of Search ............. 285/18, DIG. 13, 322, 285/323, 310, 348, 342, 81; 279/1 R, 1 G, 8, 42, 99, 115

[56] References Cited

UNITED STATES PATENTS

| 3,108,825 | 10/1963 | Mac Donald | 285/18 |
|---|---|---|---|
| 3,248,135 | 4/1966 | Meripol | 285/323 |
| 3,393,926 | 7/1968 | Arnold | 285/18 |
| 3,704,033 | 11/1972 | Arnold | 285/18 |
| 3,815,940 | 1/1974 | Lackenbill | 285/323 X |

FOREIGN PATENTS OR APPLICATIONS 916,006  1/1963  United Kingdom ........ 285/DIG. 13

*Primary Examiner*—G. V. Larkin
*Attorney, Agent, or Firm*—Bill B. Berryhill

[57] ABSTRACT

Apparatus for connecting a cylindrical first member to a second cooperating member comprising: a tubular housing adapted for connection to the second member and to coaxially receive a portion of the cylindrical first member; a gripping assembly carried by the housing and movable from a radially expanded position, in which the first member portion may be axially received in and displaced from the housing, to a radially contracted position gripping the exterior of the first member and preventing its axial displacement from the housing; and an actuating assembly carried by the housing, engageable with the gripping assembly and being operable by a force applied externally of the housing for moving the gripping assembly between its expanded and contracted positions, the actuating assembly being self-locking so that upon removal of the externally applied force the gripping assembly remains in its gripping contracted position.

30 Claims, 10 Drawing Figures

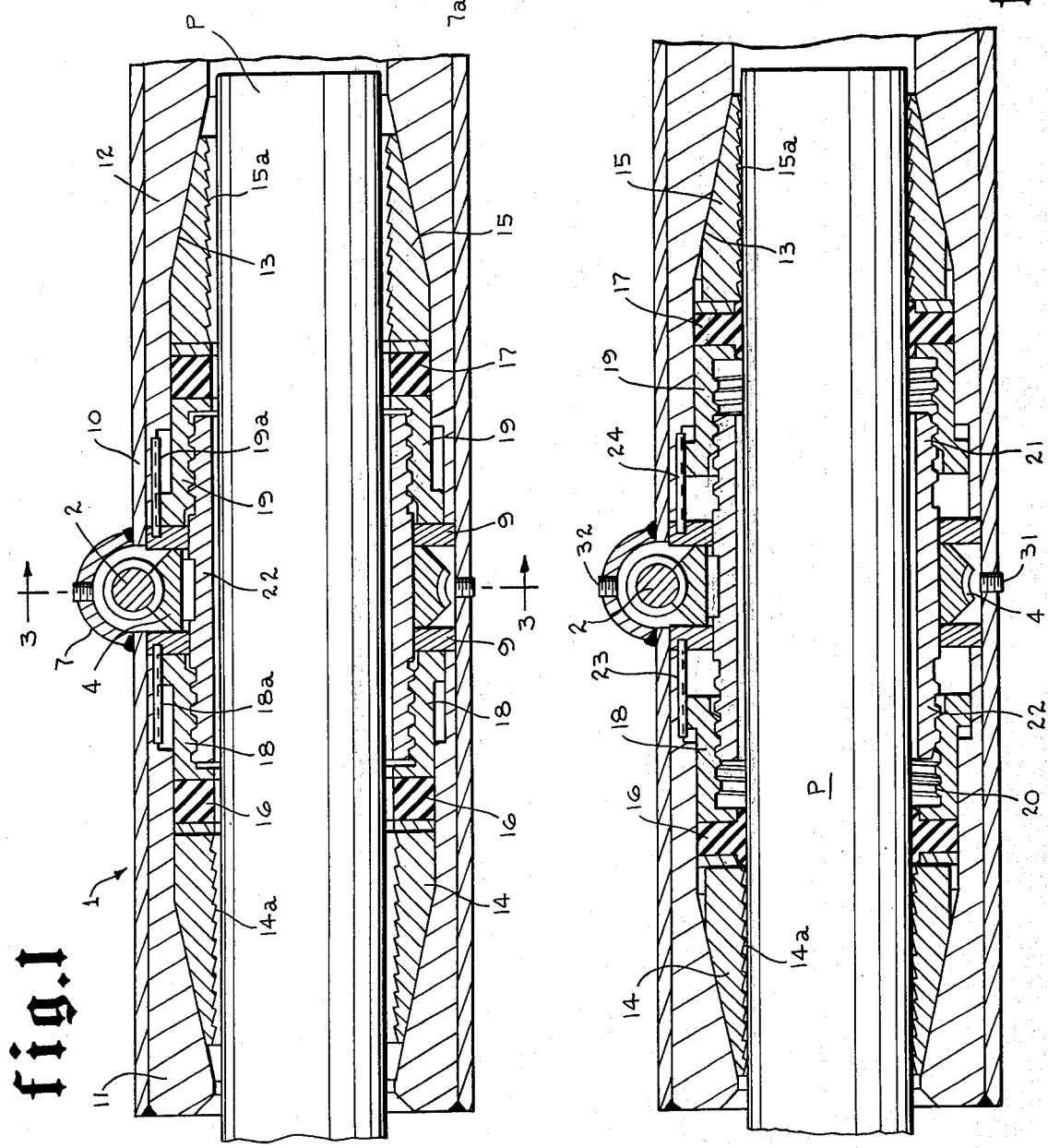

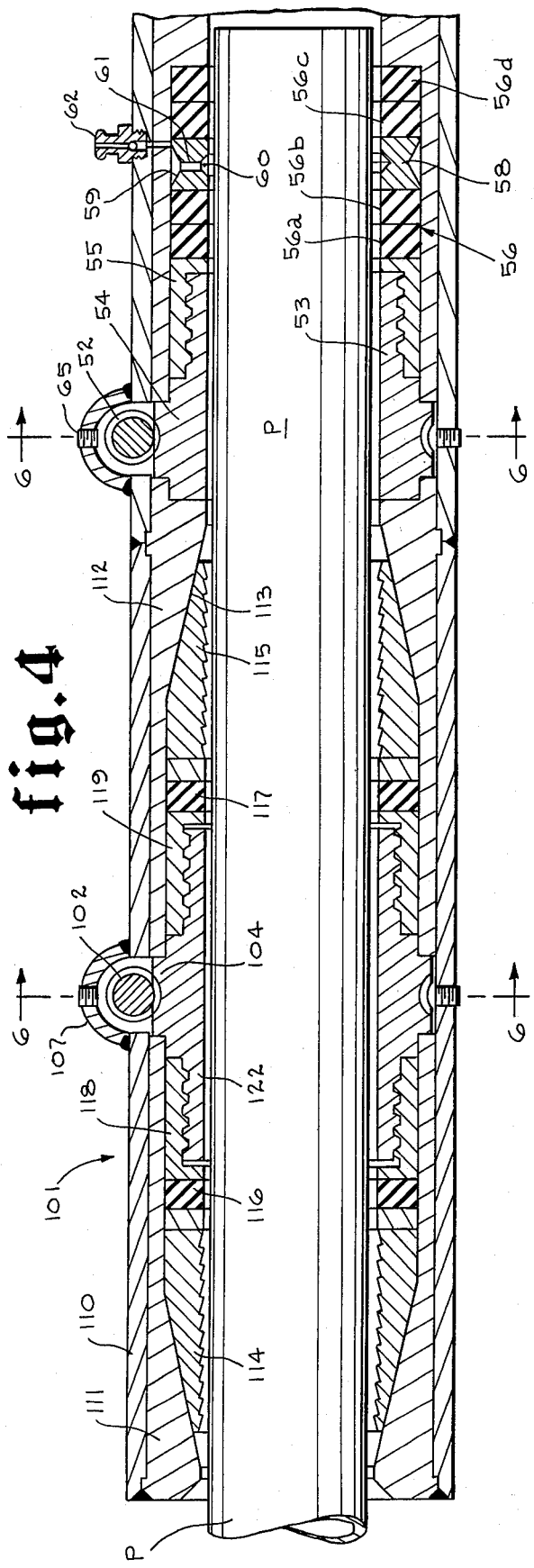
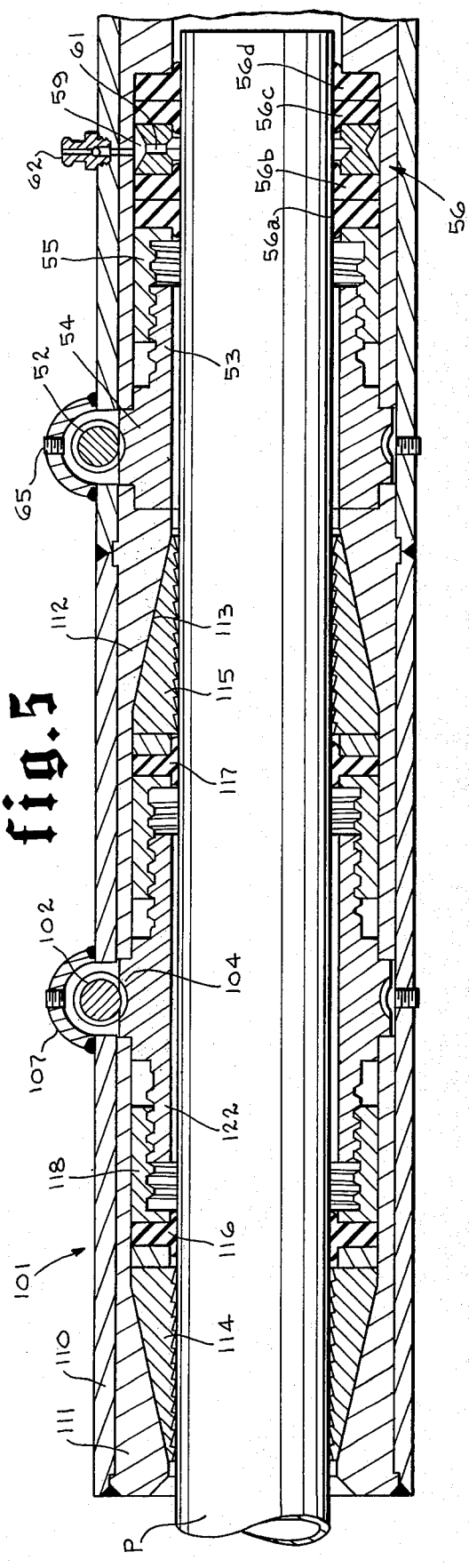

CONNECTOR APPARATUS

BACKGROUND OF THE INVENTION

1. Field of the Invention

The present invention pertains to connector apparatus. More specifically, it pertains to apparatus suitable for connecting pipes in particularly difficult environments such as subaquatic ones.

2. Description of the Prior Art

It is known to connect pipes together using tapered slip wedges, which have conical outer surfaces and circumferentially grooved cylindrical inner surfaces, by urging the wedges along an inwardly tapering abutment wall to cause the slips to move radially inwardly relative to a connector sleeve for clamping the external surface of a pipe. In existing forms of such connectors, the slips are generally forced apart by the application of fluid under pressure to an annular piston or a plurility of piston rams arranged around the axis of the pipe connector.

Such an arrangement has been proposed for use in subaquatic environments, for example in the connection of pipelines for conveying liquid hydrocarbons from a submarine well. Examples of such apparatus may be seen in U.S. Pat. No. 3,393,926 and British Pat. Nos. 1,285,803 and 1,368,122. One advantage of such apparatus is the fact that the driver need only connect a source of hydraulic pressure to a pressure port on the connector to enable opposed slips to be driven into an engaged position to lock the connector against the pipe.

However, such arrangements have a disadvantage in that when the hydraulic pressure source is later disconnected from the pipe connector there are problems of sealing against escape of hydraulic fluid in order to prevent relaxation of the slips. One way of overcoming this disadvantage is to use a setting resin as the hydraulic medium so that the resin is allowed to set to hold the slips in position and once the resin has set it cannot escape. However, once the resin has hardened it is not possible to later apply additional slip engaging displacement to the connector for further tightening or release of the connector.

SUMMARY OF THE PRESENT INVENTION

To eliminate the problems associated with hydraulic actuation, namely subsequent relaxation of the slips, the connector of the present invention is actuated by non-return mechanical means. In a preferred form of the invention, slips are driven apart by a screw arrangement, comprising thrust sleeves threadedly engageable with a common drive sleeve. The drive sleeve may advantageously be driven by a worm wheel arrangement so that as the worm is rotated, the worm wheel rotates the drive sleeve to drive the thrust sleeve and slips away from the worm wheel by virtue of opposed hand threaded inner engagement between the thrust sleeve and the drive sleeve.

Resilient buffer rings may desirably be provided between each set of slips and the associated thrust ring with a view to accommodating any axial misalignment between the various segmental slips of each set. Alternatively, the thrust ring may be formed by integral extensions of the slips so that the pinion is directly threadedly engageable with each of the slips.

Advantageously the worm and worm wheel may be encased within a protective housing which defines or includes the bearings for the worm wheel and which for submarine use includes a flushing port to enable water to be flushed from at least the portion of the housing surrounding the worm and worm wheel. The water may be displaced by an anti-corrosion oil. In one embodiment of the invention, seals are incorporated between the opposed sets of slips so that upon actuation of the slips, a seal is also effected with the connected pipes. However, in another preferred embodiment of the invention, the primary seals are advantageously separated from the slips so that they can be independently subjected to axial deformation sufficiently to ensure adequate sealing engagement of the connected pipes, without placing limitations on the thrust force applied to the connector slips. The seals may comprise at least two seal rings or sets of seal rings separated by a manifold or chamber for introducing a test fluid to enable pretesting of the seal before final assembly.

Thus, the present invention provides a pipe connector, including opposed slip sets, received within oppositely tapering conical bore portions of the connector and non-return gearing effective to drive the sets of slips away from one another, along the tapered wedge surfaces for radial inward displacement of the slips and gripping engagement with the pipes to be connected. In addition to gripping connection, a fluidtight seal is provided. Many other objects and advantages of the invention will be apparent from the drawings and description which follows.

BRIEF DESCRIPTION OF THE DRAWINGS

FIG. 1 is a longitudinal sectional view of a first embodiment of the connector apparatus of the present invention in which the slips are shown in radially expanded non-gripping positions;

FIG. 2 is a view similar to FIG. 1 but showing the slips driven apart into a radially contracted position gripping the exterior of the surrounded pipe;

FIG. 3 is a cross-sectional view, taken along line 3–3 of FIG. 1 of the worm and worm wheel actuating assembly of FIGS. 1 and 2;

FIG. 4 is a longitudinal sectional view, according to an alternate embodiment of the invention, of a pipe connector in which the primary seal is disposed at a position axially displaced from the gripping assembly and showing both the slips and seal in their radially expanded non-engaging position;

FIG. 5 is a view similar to FIG. 4 but showing the slips and the seal in their radially contracted positions gripping the exterior of the pipe which they surround;

DESCRIPTION OF PREFERRED EMBODIMENTS

Figure 6:
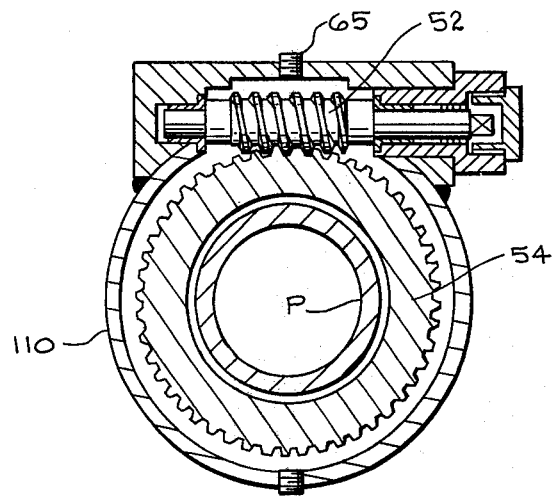
FIG. 6 is a cross-sectional view, taken along line 6—6 of FIG. 4, illustrating the worm and worm wheel gearing of the embodiment of FIGS. 4 and 5.

Referring first to FIGS. 1–3, a first embodiment of the invention will be described. The connector 1 of this embodiment is shown disposed around a cylindrical member or pipe P which is to be joined to a cooperating member (not shown). The housing 10 may be provided with any suitable means, to be illustrated hereafter, for connection to the cooperating member (not shown) which in the present case would most likely be the end of another section of pipe.

The connector 1 includes a worm 2 carried on a shaft 5 supported by means of bearings 6 within a housing 7 sealed to the exterior of the connector by welds 7a. First and second axially spaced cylindrical cams or wedge members 11 and 12 are secured to the innerface of a tubular outer casing 10 of the connector 1 in such a way that the cams 11 and 12 are secured against axial displacement relative to one another and to the casing 10. Each of the cams includes a tapering internal bore portion 13 of generally conical form dimensioned to allow the slips 14 and 15 to be disposed between the cams 11 and 12 and the pipe P to be clamped to the connector.

As shown in FIG. 1, the slips 14 and 15, when retracted in an axially inward direction toward the worm wheel 4, are positioned clear of the tapered bore portions of cams 11 and 12 to leave a clear bore through the center of the connector which is easily able to accomodate the pipe P. This position may be referred to as a radially expanded position. However, when the slips 14 and 15 are forced apart, they mount the tapering bore portions 13 of the cams or wedge members 11 and 12 to be driven radially inwardly toward the radially contracted FIG. 2 configuration in which the pipe P is gripped thereby.

Although not clearly shown in FIGS. 1 and 2, the slips denoted by the references 14 and 15 in each of these figures are segmental slips which, together with the remaining similar slips of each set, form an axially displaceable, radially movable ring operating in much the same fashion as the slips of a drill chuck.

Driving apart of the slips is achieved by means of a screw jack mechanism comprising a drive sleeve 22 having its external surface keyed at 8 to worm wheel 4 which is driven around the axis of the connector 1 by rotation of the worm 2. Thus the drive sleeve 22 is rotatable relative to two thrust collars or sleeves 18 and 19 which are threadedly inter-engageable with the drive sleeve 22 by means of threads of opposed hands so that when the sleeve 22 is rotated in one direction the thrust collars 18 and 19, being splined to the cams 11 and 12 at 18a and 19a, respectively, are caused to move apart, i.e. away from the worm wheel 4, to drive seal rings 16 and 17 against the associated slips 14 and 15.

Driving of the seal rings against the slips 14 and 15 will initially move the slips apart into camming engagement with the tapered bore portion 13 of the cams 11 and 12 and subsequently radially inwardly into gripping engagement with the pipe P by virtue of grooved inner cylindrical surfaces 14a and 15a. The grooved surfaces 14a and 15a are arranged, in known manner, in such a way that when the slip 14 engages the pipe it locks the pipe against retraction from the connector (i.e. prevents tensile displacement) and when the slips 15 are in engagement with the pipe, the grooved surface 15a prevents displacement of the pipe inwardly of the connector (i.e. prevents compressive displacement of the pipe). For example, these grooved surfaces 14a and 15a may comprise teeth, the crests of which point in opposite directions.

In the latter stages of movement of the thrust collars 18 and 19, the seals 16 and 17 will become axially compressed to effect sealing engagement with the pipe and connector 1.

The worm wheel 4 is in this case locked against axial displacement along the connector by means of two bearing plates 9 which also serve to locate the drive sleeve 22 substantially coaxially of the connector while allowing slight axial displacement of the sleeve 22 relative to the connector in the event of unequal displacement of the slips 14 and 15 during tightening up of the connector.

The need for this axial locking motion arises because the worm wheel 4 may have teeth of concave form (as viewed in FIG. 1) to conform with the circular cross-section of the worm 2. This axial locking may be obtained by other arrangements such as extending the cylindrical cams or wedges 11 and 12 axially inwardly to serve as axial abutments for the worm wheel 4 or as both axial and radial abutments for the drive sleeve 22 where the worm wheel 4 is integral with the drive sleeve instead of being axially slidable thereon as shown in the drawings. A further possibility is to eliminate the need for axial confinement or locking of the worm wheel 4 by using a tooth shape on the worm with flat (i.e. axially extending) teeth as opposed to the concave form shown in the drawings.

As shown in FIG. 3, a removable cover 27 at one end of the worm housing 7 can be taken away to allow access to a square end 25 of the worm spindle or shaft 5 for the purpose of rotating the worm. This rotation can be achieved either by manual operation using a suitable square spanner, or more preferably by drive means such as an electric or hydraulic motor which can more easily be operated on the sea bed.

Seals 28 are interposed between the worm shaft 5 and the inner surface of the insert 7b which, during assembly of the worm housing, is inserted together with the accompanying bearing 6 and the seals 28 into the housing 7 around the shaft 5 once the worm has itself been inserted with the other of the bearings 6. In this way, the seals 28 prevent ingress of sea water while the cap is removed for the purpose of rotating the worm 2 for tightening the connector slips 14 and 15 onto the pipe.

The worm housing 7 may be provided with a plug 32 closing a flushing bore and a similar plug 31 closing a diametrically opposed flushing bore which are able to be removed in order to allow injection of an anti-corrosion oil into one of the ports 31 or 32, preferably the top port, to flush sea water out through the other port enabling the space between the worm housing 7 and the surrounding parts of the drive mechanism to be filled with anti-corrosion oil and flushed of corrosive sea water. Once the flushing operation is complete, the plug at the exit port, in this case the plug 31, is first of all inserted and then the flow of flushing fluid will be arrested and the other plug, in this case plug 32, can then be inserted in the appropriate flushing bore.

Now referring to FIGS. 4–6, an alternate embodiment of the connector of the present invention is shown in which the main sealing elements are removed to a position axially displaced from the gripping or slip elements. The gripping or slip elements are similar to those described with reference to the embodiment of FIG. 1–3 and like elements will be designated by the same reference numbers added to 100. Thus 1 becomes 101 for similar components.

The connector 101 comprises a tubular casing or housing 110, and is adapted to coaxially receive a pipe portion P. The gripping assembly comprises a set of slips 114 and 115 which may be axially displaced in opposite directions for radial contraction to grippingly engage the pipe P as shown in FIG. 5.

The actuation for the gripping assembly is provided by the drive sleeve 122, worm wheel 104, which in this case is integrally formed with the drive sleeve 122, and worm 102. Rotation of the worm 102 causes the drive sleeve 122 to rotate forcing, by virtue of opposite handed threads, axial displacement in opposing directions of the thrust collars or sleeves 118 and 119. As in the previously described embodiment, such axial displacement causes the slips 114 and 115 to be radially contracted by virtue of tapered bore portions 113 into the gripping position of FIG. 4.

Although another primary seal arrangement is provided, seals 116 and 117 may be provided to accommodate any axial misalignment between the various segmental slips of a set. In addition, seals 116 and 117 may provide at least enough sealing to allow displacement of sea water from the housing by an anti-corrosion oil. However, the primary seal of this embodiment is disposed at an axially displaced position for actuation by a second actuating assembly including worm 52 and worm wheel 54. The worm wheel 54 may be provided with a threaded axial projection or drive sleeve 53 having external threads in engagement with internal threads of a thrust sleeve 55 which bears against the seal assembly 56.

The seal assembly may include a plurality of seal rings 56a, 56b, 56c and 56d, the furthermost 56d of which is preferably formed from a material known as "VITON" which has a high resistance to hydrocarbons. The remaining rings 56a–56c, may be back-up sealing rings formed of the synthetic rubber material known as "BUNA-N" which is slightly less resistant to hydrocarbons but has good resilience retention characteristics over a long period of time. This means there will be less likelihood of permanent set occurring with the "BUNA-N" back-up rings than with the "VITON" primary ring 56d which is required for its hydrocarbon resistance.

In the middle of the seal arrangement, dividing the seal rings into two groups, is a fluid manifold 58 provided with radially outer and inner grooves 59 and 60 shown by radially extending passageway 61. The purpose of this ring is to allow high-pressure testing fluid, introduced by way of a test fitting 62, to come into contact with the exterior of the pipe P between the two groups of seal rings so as to test the sealing efficiency. In practice, the testing pressure can be up to but not exceeding the rated collapse pressure of the pipe P since testing will normally take place before there is any fluid pressurizing inside of the pipe P.

The fact that the manifold member 58 has an outer groove 59 means that it is able to slide through a limited distance axially of the pipe connector without losing fluid communication with the fitting 62. Thus, as the seal rings 56a–d are compressed by the thrust sleeve 55, the manifold member 58 can move to the right, as shown in FIG. 4, and will still remain in alignment with the fitting 62 for pressure testing after the seal rings have been compressed, as in FIG. 5.

The primary sealing action will take place at the rings 56a—d. As earlier stated, there will be secondary sealing functions from elastic rings 116 and 117 which are primarily intended to absorb differences in the final slip positions and retain oil surrounding the worm 102 and worm wheel 104 of the slip actuating assembly.

As best seen in FIG. 6, the worm 52 and worm wheel 54 arrangement of the seal actuator is substantially the same, though independently operated, as the worm 102 and worm wheel 104 arrangement of the gripping actuator. As in the case of the worm housing 7 of FIG. 1, a water flush port 65 may be provided in the housing of the worm 52.

The advantage of placing the primary seal assembly 56 outside the space confined between the two sets of slips 114 and 115 is that the axial compression to which the seals 56a–d is subjected can be optimized for best sealing effect, whereas a completely different criterion may govern the slip gripping pressure at the actuating assembly of the slips in order to provide the desired gripping action of the slips on the pipe P. In addition, the seal assembly 56 can be tested before the slips 114 and 115 are set, so that if the seals do not hold pressure, the device can be dismantled for rectification.

Alternatively, the seal assembly 56 could have been placed outboard of the slip assemblies, but it is more sensible for the seals to be nearest the opening at the end of the pipe P so that the hydrocarbons in the pipeline are kept away from the tapered slips 114 and 115.

FIGS. 7–10 schematically represent various applications of the connector apparatus of the embodiment of FIGS. 4–6. Of course, the same applications could be adapted to the connector of FIGS. 1–3.

Figure 7:
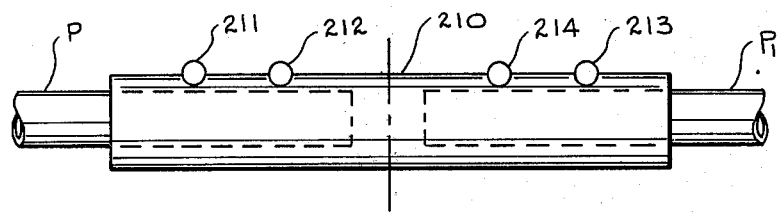
FIGS. 7–10 are schematic views illustrating various applications of the connector apparatus of the present invention.

As shown in FIG. 7, a connector 210 can be devised with two sets of gripping and seal assemblies, such as the one described with reference to FIGS. 4–6, for placing pipe P and pipe $P_1$ in fluid communication. The first set of grippers would be actuated by the worm 211 and the primary seal actuated by worm 212. The second set of grippers for gripping pipe $P_1$ would be actuated by worm 213 whereas its primary seal would be actuated by worm 214. Thus, each of the pipe sections P and $P_1$ would be locked against tensile and compressive displacement.

Figure 8:
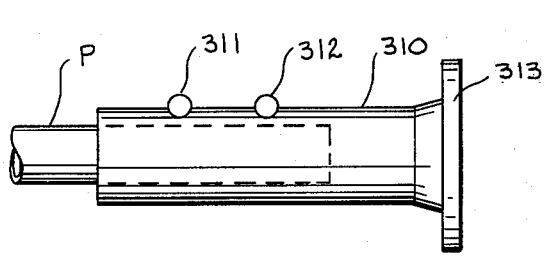

Similarly, FIG. 8 illustrates a connector 310 of the type shown in FIGS. 4–6, at one end of which is provided a flange 313 for connection to a suitably flanged adjacent component (not shown) such as a well head or a further flanged pipe connector. Actuation of the gripping assembly would be by worm 311 and actuation of the primary seal by worm 312.

Figure 9:
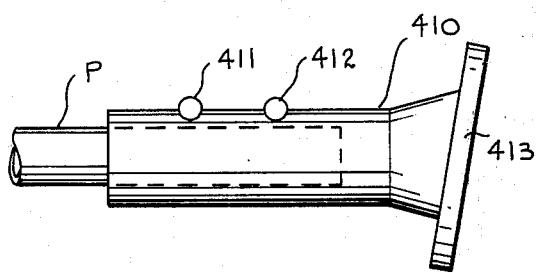

The connector 410 of FIG. 9 is almost identical to the one of FIG. 8 except that its flange is placed on a bias for connection with a non-axially aligned component (not shown).

Figure 10:
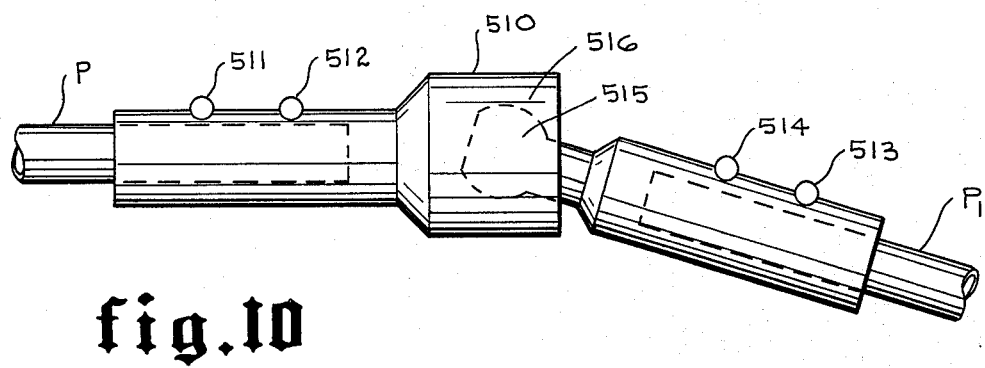

FIG. 10 illustrates a connector 510 provided with a ball and socket 515 and 516 which allows pipes P and $P_1$ to be connected in any desired orientation. Gripping of the pipes P and $P_1$ may be through the rotation of worms 511 and 513, respectively, while seals are established by rotation of worms 512 and 514, respectively. Suitable clamping and seal devices may be arranged around the ball and socket to lock the ball 515 relative to the socket and to impose adequate sealing effect between the ball and socket once the pipes P and $P_1$ have been generally arranged in their desired positions.

Although each of the preferred embodiments of the connector illustrated in the drawings uses a drive sleeve or screw and worm and worm wheel drive, it will be appreciated that, in the absence of vibration in use of the pipeline, the sleeve itself would have a very fine pitch thread and could be itself considered a non-return gearing mechanism. Thus, the worm and worm wheel drive might be replaced by an alternative method of driving the sleeve from outside the pipeline.

Although the worm and worm wheel mechanism is inherently self-locking so that upon removal of an externally applied force, all components would remain in position, a ratchet mechanism might be connected as a safety feature, to guard against accidental unscrewing of the device in the event of vibration of the pipeline.

Although in the preferred embodiment of the connector, the actuating means comprises a single drive sleeve engaging separate thrust sleeves of opposite hand, it would be possible instead to use a single thread engagement, for example, by allowing the drive sleeve to slide axially leftwardly as the thrust sleeve moves rightwardly, the thrust sleeve being in abutting engagement with one set of slips and the drive sleeve being in direct abutting engagement with the other set of slips, rather than by way of another thrust sleeve. With this variant, the worm wheel might be slideably keyed to the sleeve or given straight teeth (instead of concave) and then integrally fixed to the drive sleeve. Many other variations of the invention could be made by those skilled in the art without departing from the spirit of the invention. Therefore, it is intended that the scope of the invention be limited only by the claims which follow.

We claim:

1. Apparatus for connecting a cylindrical first member to a second cooperating member comprising;
   a tubular housing having means for connection to said second member and adapted to coaxially receive a portion of said cylindrical first member;
   gripping means carried by said housing and movable from a radially expanded position, in which said first member portion may be axially received and displaced from said housing, to a radially contracted position gripping the exterior of said first member and preventing its axial displacement from said housing; and
   actuating means carried by said housing, engageable with said gripping means and being operable by a force applied externally of said housing for moving said gripping means between said expanded and contracted positions, said activating means being self-locking so that upon removal of said externally applied force said gripping means remains in said gripping contracted position.

2. Connector apparatus as set forth in claim 1 in which said actuating means comprises means rotatable by said externally applied force, thrust means axially movable within said housing and engageable with said gripping means and means for translating rotating movement of said rotatable means to axial movement of said thrust means for applying an axial force to said gripping means to effect said movement to said radially contracted position.

3. Connector apparatus as set forth in claim 2 in which said translating means comprises a rotatable sleeve member threadedly engaging said thrust means for said axial movement thereof in response to rotation of said rotating means.

4. Connector apparatus as set forth in claim 3 in which said thrust means comprises a second sleeve member having threads mutually engaging threads on said rotatable sleeve member and an annular seal member between said second member and said gripping means.

5. Connector apparatus as set forth in claim 4 in which said annular seal member, upon application of said external force and movement of said gripping means to said contracted position, is compressed between said gripping means and said second sleeve member, sealingly engaging said cylindrical first member to seal the interior of said housing against the exterior environment thereof.

6. Connector apparatus as set forth in claim 5 in which said housing is provided with port means by which said housing may be flushed and filled with a protective fluid upon said sealing engagement of said annular seal member with said cylindrical first member.

7. Connector apparatus as set forth in claim 3 in which said rotating means comprises a first gear member affixed to said sleeve member for rotation therewith and a second gear member engageable with said first gear member to drive said first gear member and sleeve member in response to said externally applied force.

8. Connector apparatus as set forth in claim 7 in which said first gear member comprises a worm wheel and said second gear member comprises a worm mounted on a shaft to which said externally applied force may be applied.

9. Connector apparatus as set forth in claim 8 in which said sleeve member is slidingly mounted within said worm wheel for limited axial movement relative thereto, bearing means being provided on opposite sides of said worm wheel to prevent axial displacement thereof.

10. Connector apparatus as set forth in claim 8 in which the outside and root diameters of said worm wheel teeth are constant throughout the width of said teeth, permitting limited axial movement of said worm wheel without disengaging said worm.

11. Connector apparatus as set forth in claim 1 in which said gripping means comprises: first and second axially spaced wedge means having tapered wedge surfaces converging, in opposite directions, toward the axis of said tubular housing; and first and second slip means having tapered outer surfaces cooperating, respectively, with the wedge surfaces of said first and second wedge means upon axial movement of said first and second slip means in opposite directions in response to operation of said actuating means to effect radially contracting movement of said first and second slip means for said gripping engagement with said first cylindrical member.

12. Connector apparatus as set forth in claim 11 in which the inner faces of said slip means are provided with friction means circumferentially surrounding said cylindrical first member for engagement therewith.

13. Connector apparatus as set forth in claim 12 in which said friction means comprises teeth of which those on said first and second slip means have crests pointing in generally opposite directions to prevent axial displacement of said cylindrical first member in either direction.

14. Connector apparatus as set forth in claim 11 in which said actuating means comprises a drive sleeve surrounding said cylindrical first member between said first and second slip means, first and second thrust means threadedly engaging the opposite ends of said drive sleeve for axial movement in opposing directions in response to rotation of said drive sleeve for effecting said axial and radially contracting movement of said slip means.

15. Connector apparatus as set forth in claim 14 in which said actuating means comprises a first gear member affixed to said drive sleeve for rotation therewith and a second gear member engageable with said first gear member to rotatingly drive said first gear member and drive sleeve in response to said externally applied force.

16. Connector apparatus as set forth in claim 5 in which said first gear member comprises a worm wheel and said second gear member comprises a worm mounted on a shaft by which said externally applied force may be applied.

17. Connector apparatus as set forth in claim 14 including first seal means between said first thrust means and first slip means and second seal means between said second thrust means and slip means, compressible upon said axial and radially contracting movement of said slip means for sealing engagement with said cylindrical first member to seal the interior of said housing against the exterior environment thereof.

18. Connector apparatus as set forth in claim 11 further comprising:
 annular seal means carried by said housing and axially spaced from said gripping means for surrounding a portion of said cylindrical first member, said seal means being compressible from a relaxed position, in which said first member portion may be axially received therein to a compressed position, sealingly engaging said cylindrical first member; and
 second actuating means carried by said housing engaging said annular seal means and being operable by a second externally applied force for moving said annular seal means between said relaxed and compressed positions.

19. Connector apparatus as set forth in claim 1 further comprising:
 annular seal means carried by said housing and axially spaced from said gripping means for surrounding a portion of said cylindrical first member, said seal means being compressible from a relaxed position, in which said first member portion may be axially received therein, to a compressed position, sealingly engaging said cylindrical first member; and
 second actuating means carried by said housing engaging said annular seal means and being operable by a second externally applied force for moving said annular seal means between said relaxed and compressed positions.

20. Connector apparatus as set forth in claim 19 in which said actuating means comprises means rotatable by said second externally applied force, thrust means axially movable within said housing and engageable with said annular seal means, and means for translating rotating movement of said rotatable means to axial movement of said thrust means for axially compressing said seal means into said compressed positions.

21. Connector apparatus as set forth in claim 20 in which said translating means comprises a rotatable drive sleeve threadedly engaging said thrust means for said axial movement thereof in response to rotation of said rotatable means.

22. Connector apparatus as set forth in claim 21 in which said rotatable means comprises a first gear member affixed to said drive sleeve for rotation therewith and a second gear member engaging said first gear member to rotate said drive sleeve in response to application of said second externally applied forces.

23. Connector apparatus as set forth in claim 22 in which said first gear member comprises a worm wheel and said second gear member comprises a worm mounted on a shaft by which said second externally applied force may be applied.

24. Connector apparatus as set forth in claim 22 in which said housing is provided with port means by which said housing may be flushed and filled with a protective fluid upon said compression of said seal means.

25. Connector apparatus as set forth in claim 19 in which said seal means comprises at least one resilient seal ring disposed between an annular surface of said housing and an axially moveable thrust member of said second actuating means, said seal ring being movable to said compressed position by said axially movable thrust member in response to said second externally applied force.

26. Connector apparatus as set forth in claim 25 in which said seal means comprises at least two of said seal rings separated by an annular fluid manifold ring, port means being provided in said housing for communication with said manifold ring to test for leaking of said seal rings.

27. Apparatus for connecting a cylindrical first member to a second cooperating member comprising:
 a tubular housing having means for connection to said second member and adapted to coaxially receive a portion of said cylindrical first member;
 gripping means carried by said housing including first and second axially spaced wedge means having tapered wedge surfaces, converging in opposite directions toward the axis of said housing and first and second slip means cooperating, respectively, with said first and second wedge means surface upon relative axial movement of said first and second slip means in opposite directions to move said slip means from radially expanded positions, not engaging said cylindrical first member, to radially contracted positions, gripping the exterior of said first member and preventing its displacement from said housing;
 annular seal means carried by said housing and axially spaced from said gripping means for surrounding a portion of said cylindrical first member, said seal means being compressible from a relaxed position to a compressed position, sealingly engaging said cylindrical first member;
 first actuating means carried by said housing operable by a force applied externally of said housing to effect said relative axial movement of said first and second slip means for said movement to said radially contracted position; and
 second actuating means carried by said housing operable by a second externally applied force for moving said seal means between said relaxed and compressed positions.

28. Connector apparatus as set forth in claim 27 in which each of said actuating means comprises means rotatable by its respective externally applied forces, thrust means axially movable within said housing and engageable with, respectively, said gripping means and said seal means, and means for translating rotating movement of said rotatable means to axial movement of said thrust means to effect respective movement of said gripping means to said radially contracted position and said seal means to said compressed position.

29. Connector apparatus as set forth in claim 28 in which said translating means in each of said actuating means comprises a rotatable sleeve member threadedly engaging a threaded portion of its respective thrust means for said axial movement thereof in response to rotation of said rotating means.

30. Connector apparatus as set forth in claim 29 in which said rotating means in each actuating means comprises a worm wheel affixed to its respective sleeve member for rotation therewith and a worm mounted on a shaft by which said externally applied forces may be independently applied.

* * * * *

UNITED STATES PATENT OFFICE
CERTIFICATE OF CORRECTION

Patent No. 3,999,782          Dated December 28, 1976

Inventor(s) Keith Shotbolt and Pierre Ory

It is certified that error appears in the above-identified patent and that said Letters Patent are hereby corrected as shown below:

On the Title Page, under the heading [30] entitled "Foreign Application Priority Data", the first patent on which priority is claimed should read as follows:

-- Nov. 14, 1974    FRANCE . . . . . . . . . . 74.37533 --

Signed and Sealed this

Sixth Day of December 1977

[SEAL]

Attest:

RUTH C. MASON
*Attesting Officer*

LUTRELLE F. PARKER
*Acting Commissioner of Patents and Trademarks*